United States Patent
Olgaard et al.

(10) Patent No.: US 7,865,147 B2
(45) Date of Patent: Jan. 4, 2011

(54) SYSTEM FOR TESTING AN EMBEDDED WIRELESS TRANSCEIVER

(75) Inventors: Christian Volf Olgaard, Sunnyvale, CA (US); Peter Petersen, Brentwood, CA (US)

(73) Assignee: LitePoint Corporation, Sunnyvale, CA (US)

( * ) Notice: Subject to any disclaimer, the term of this patent is extended or adjusted under 35 U.S.C. 154(b) by 685 days.

(21) Appl. No.: 11/839,828

(22) Filed: Aug. 16, 2007

(65) Prior Publication Data

US 2008/0287117 A1 Nov. 20, 2008

Related U.S. Application Data

(63) Continuation-in-part of application No. 11/279,778, filed on Apr. 14, 2006, now Pat. No. 7,689,213.

(51) Int. Cl.
*H04B 17/00* (2006.01)
*H03C 1/62* (2006.01)

(52) U.S. Cl. ............... 455/67.14; 455/67.11; 455/115.2

(58) Field of Classification Search ............. 455/67.14, 455/69, 522, 67.11, 68, 115.1, 115.2, 226.1, 455/513
See application file for complete search history.

(56) References Cited

U.S. PATENT DOCUMENTS

| | | | |
|---|---|---|---|
| 5,337,316 A | 8/1994 | Weiss et al. | |
| 5,481,186 A | 1/1996 | Heutmaker et al. | |
| 6,104,304 A | 8/2000 | Clark et al. | |
| 6,567,375 B2* | 5/2003 | Balachandran et al. | 370/204 |
| 6,914,944 B1 | 7/2005 | Nokkonen et al. | |
| 6,988,212 B1 | 1/2006 | Hamdi | |
| 7,065,155 B2 | 6/2006 | Kaczynski | |
| 7,206,549 B2 | 4/2007 | Lin et al. | |
| 7,263,355 B2* | 8/2007 | Morikawa et al. | 455/424 |
| 7,324,785 B2 | 1/2008 | Hansen et al. | |
| 7,515,884 B2 | 4/2009 | Blech et al. | |
| 7,565,119 B2 | 7/2009 | Cohen | |
| 7,583,976 B2 | 9/2009 | Batra et al. | |
| 7,634,815 B2* | 12/2009 | Kumaki et al. | 726/26 |
| 2004/0076138 A1* | 4/2004 | Serceki et al. | 370/349 |

(Continued)

FOREIGN PATENT DOCUMENTS

KR 10-2007-0030052 3/2007

OTHER PUBLICATIONS

International Preliminary Report on Patentability (IPRP) corresponding to International Application No. PCT/US2008/072460, International Bureau of WIPO, dated Feb. 16, 2010, 5 pages.

(Continued)

*Primary Examiner*—Sonny Trinh
(74) *Attorney, Agent, or Firm*—Vedder Price, P.C.

(57) ABSTRACT

A test equipment for testing a wireless communication device includes a wireless transceiver and a controller. The wireless transceiver transmits a first series of packets while operating in a first mode. The wireless transceiver transmits a second series of packets while operating in a second mode. The wireless transceiver receives acknowledgment packets. The controller controls the transceiver to transmit the first series of packets. The controller counts the acknowledgment packets received by the transceiver in response to transmitting each of the first series of packets. The controller controls the transceiver to transmit the second series of packets when the count exceeds a predetermined count.

17 Claims, 12 Drawing Sheets

U.S. PATENT DOCUMENTS

| | | | |
|---|---|---|---|
| 2004/0203443 | A1 | 10/2004 | Woolf et al. |
| 2004/0203467 | A1 | 10/2004 | Liu et al. |
| 2005/0032511 | A1 | 2/2005 | Malone et al. |
| 2005/0176376 | A1 | 8/2005 | Liu |
| 2005/0260962 | A1 | 11/2005 | Nazrul et al. |
| 2006/0128373 | A1 | 6/2006 | Cochrane et al. |
| 2006/0183432 | A1 | 8/2006 | Breslin et al. |
| 2006/0239337 | A1 | 10/2006 | Green et al. |
| 2007/0002753 | A1 | 1/2007 | Bailey |
| 2007/0072599 | A1 | 3/2007 | Romine et al. |
| 2007/0091814 | A1 | 4/2007 | Leung et al. |
| 2007/0093243 | A1 | 4/2007 | Kapadekar et al. |
| 2007/0105587 | A1 | 5/2007 | Lu |
| 2007/0167155 | A1 | 7/2007 | Ishidu |

OTHER PUBLICATIONS

U.S. Appl. No. 11/839,814, filed Aug. 16, 2007, entitled "System for Testing an Embedded Wireless Transceiver".

U.S. Appl. No. 11/279,778, filed Apr. 14, 2006, entitled "Method for Testing Embedded Wireless Transceiver with Minimal Interaction Between . . . ".

U.S. Appl. No. 11/161,692, filed Aug. 12, 2005, entitled "Method for Measuring Multiple Parameters of a Signal Transmitted by a Signal Generator".

U.S. Appl. No. 11/839,788, filed Aug. 16, 2007, entitled "Apparatus, System and Method for Calibrating and Verifying a Wirelss Communication Device".

U.S. Appl. No. 11/422,475, filed Jun. 6, 2006, entitled "Method for Capturing Multiple Data Packets In A Data Signal for Analysis."

U.S. Appl. No. 11/422,489, filed Jun. 6, 2006, entitled "Apparatus For Capturing Multiple Data Packets In A Data Signal For Analysis."

International Search Report corresponding to International Application No. PCT/US2007/066211 dated Nov. 24, 2008, 2 pages.

Written Opinion corresponding to International Application No. PCT/US2007/066211 dated Nov. 24, 2008, 5 pages.

International Search Report for International Application No. PCT/US08/72473 dated Oct. 30, 2008, 3 pp.

Written Opinion for International Application No. PCT/US08/72473 dated Oct. 30, 2008, 4 pp.

International Search Report for International Application No. PCT/US08/72460 dated Oct. 22, 2008, 4 pp.

Written Opinion for International Application No. PCT/US08/72460 dated Oct. 22, 2008, 3 pp.

Office Action dated Jul. 28, 2010 corresponding to U.S. Appl. No. 11/839,788, 9 pages.

Office Action dated Aug. 9, 2010 corresponding to U.S. Appl. No. 11/839,814, 7 pages.

\* cited by examiner

SYSTEM FOR TESTING AN EMBEDDED WIRELESS TRANSCEIVER

RELATED CO-PENDING APPLICATIONS

This application is a continuation-in-part of U.S. patent application Ser. No. 11/279,778 filed on Apr. 14, 2006. This application is also related to co-pending application entitled "SYSTEM FOR TESTING AN EMBEDDED WIRELESS TRANSCEIVER", filed on even date, inventor Christian Olgaard.

BACKGROUND

1. Field

The present disclosure relates to wireless communication systems having a host processor and wireless transceiver embedded therein, and in particular, to production testing of such systems.

2. Related Art

As the number and uses of wireless data communication systems increase, it has become increasingly important to the manufacturers of such systems to perform production testing of the wireless transceivers embedded in such systems in a more time-efficient manner. As is well known, a problem with production testing of such embedded transceivers is that no direct, e.g., wired, digital control connection is generally available between the device under test (DUT) and the test controller (e.g., personal computer). Instead, communication must take place through the host processor also embedded within the system. Accordingly, production testing becomes more complicated since testing firmware must be installed or stored for running on the embedded host processor.

While using firmware in an embedded processor may be acceptable for a single platform, this approach quickly becomes unacceptable when multiple platforms are involved and must be supported. Further, as is often the case, the wireless transceiver function, e.g., a wireless data transceiver operating according to the IEEE 802.11 standard, is merely a small portion of the overall set of functions of the host system. Accordingly, the manufacturer, while interested in producing a fully functional wireless transceiver capability, is nonetheless not interested in spending significant resources on integrating the wireless function in view of its limited role in the overall operation of the system. Therefore, it would be desirable to provide for a simpler and more streamlined method of production testing for such systems, with only minimal changes required when performing production testing of various systems.

SUMMARY

In one example, test equipment for testing a wireless communication device includes a wireless transceiver and a controller. The wireless transceiver transmits a first series of packets while operating in a first mode. The wireless transceiver transmits a second series of packets while operating in a second mode. The wireless transceiver receives acknowledgment packets. The controller controls said transceiver to transmit said first series of packets. The controller counts said acknowledgment packets received by said transceiver in response to transmitting each of said first series of packets. The controller controls said transceiver to transmit said second series of packets when said count exceeds a predetermined count. A related method is also disclosed.

In one example, said transceiver transmits at a first power level when in said first mode and a second power level when in said second mode. In one example, said transceiver transmits using a first modulation technique when in said first mode and a second modulation technique when in said second mode. In one example, said transceiver transmits at a first data rate when in said first mode and a second data rate when in said second mode.

In one example, said controller increases said first power level when said transceiver transmits a predetermined number of packets without receiving at least one of said acknowledgment packets in response to transmitting said first series of packets.

In one example, the test equipment includes memory to store information. The information includes said first mode, said second mode, a total number of packets transmitted, a total number of packet type acknowledgement packets, and/or a total number of acknowledgment packets received. In one example, said controller transfers said information to an analysis system after a predetermined number of packets have been transmitted and after receiving a last acknowledgement packet. In one example, said analysis system determines a sensitivity value and/or a packet error rate based on said information.

In one example, a wireless communication system in a test environment includes the test equipment and a device under test (DUT). The DUT receives said first series of packets and transmits said acknowledgement packets when each of said first series of packets are received.

DETAILED DESCRIPTION

Figure 1:
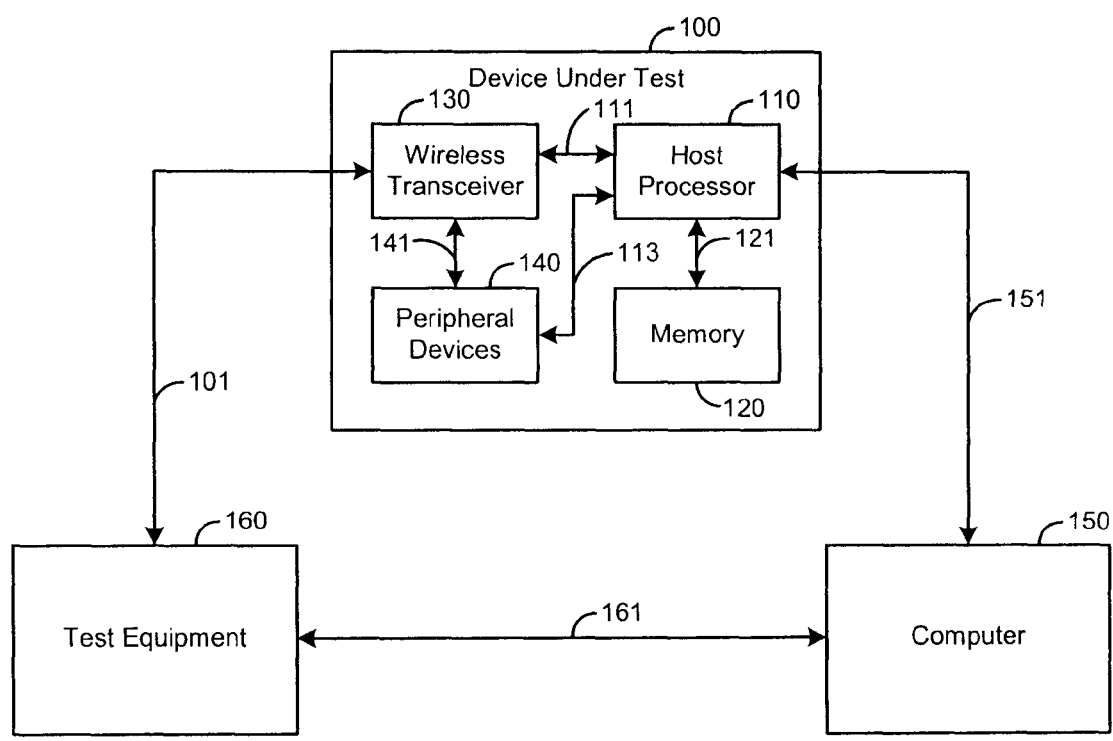
FIG. 1 is a functional block diagram of a wireless data communication system in a production test environment.

The following description of the embodiments is merely exemplary in nature and is in no way intended to limit the invention, its application, or uses. For purposes of clarity, the same reference numbers will be used in the drawings to identify similar elements. The embodiments are described in sufficient detail to enable one of ordinary skill in the art to practice the disclosure, and it will be understood that other embodiments may be practiced with some variations without departing from the spirit or scope of the subject invention.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. Absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described functionality. Additionally, the term "signal" may refer to one or more currents, one or more voltages, or a data signal. The phrase at least one of A, B, and C should be construed to mean a logical (A or B or C), using a non-exclusive logical or. Further, while the present disclosure has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Referring to FIG. 1, a wireless data communication system in a general production test environment includes a device under test (DUT) 100, a computer 150 for control of the testing, and test equipment 160 (e.g., including a vector signal generator (VSG) and a vector signal analyzer (VSA)), all interconnected substantially as shown. The DUT 100 has a number of embedded sub systems, including a host processor 110, memory 120 (e.g., non volatile memory), a wireless transceiver 130 and one or more peripheral devices 140, interconnected substantially as shown. The host processor 110 controls the memory 120, wireless transceiver 130 and peripheral devices 140 via various control interfaces 121, 111, 113. Typically, the memory 120 stores, as firmware, programs to be used by the DUT 100. The control computer 150 generally runs the production test software that controls the DUT 100 through an external interface 151, e.g., universal serial bus (USB), serial peripheral interface (SPI), RS-232 serial interface, etc. The control computer 150 also controls the test equipment 160 via another interface 161, e.g., USB, general purpose interface bus (GPIB), Ethernet, etc. The test equipment 160 communicates with the wireless transceiver 130 via an interface 101, which can be a wireless interface, but for production testing purposes is usually a wired interface.

In a typical transmitter test scenario, the control computer 150 will send one or more commands to the host processor 110, which translates such commands into corresponding commands for the wireless transceiver 130. Following transmission of the test signal via the test interface 101, the control computer 150 retrieves the measurement results from the test equipment 160 (via its interface 161), following an appropriate delay for the wireless transceiver 130 to settle at its programmed output frequency and power.

As can be seen by this example, the commands necessary for the wireless transceiver 130 must pass through and be translated by the host processor 110. As the host processor 110 can be of many different types, and run many different operating systems, it will generally be very difficult to provide the necessary software inside the host processor 110 for translating the commands appropriately. Normally, such software must be written specifically for each application, thereby making it a difficult process for a system integrator to integrate the wireless transceiver 130 within the DUT 100.

As discussed in more detail below, a proposed test method in accordance with the present disclosure provides for simplified production testing using a predetermined test flow, or sequence, to verify the performance of the embedded wireless transceiver. By pre-programming the wireless transceiver with the test flow, minimal, if any, communication between the wireless transceiver and the host processor 110 will be needed during testing. The test flow can be uploaded to the transceiver 130 as part of the loading of the testing firmware, or can alternatively be made an integral part of the firmware, e.g., with a pre-determined data area defining the tests. After completion of the loading of the firmware into the transceiver 130, the device will be placed into a test mode where it awaits commands from the test equipment 160. This can be done as part of the firmware that is loaded, or as a separate command issued by the host processor 110. As a result, the only interaction with the host processor 110 involves the loading of the firmware, loading of the test flow (unless it is an integrated portion of the firmware), and possibly a command to place the wireless transceiver 130 in a production test mode of operation.

Figure 2:
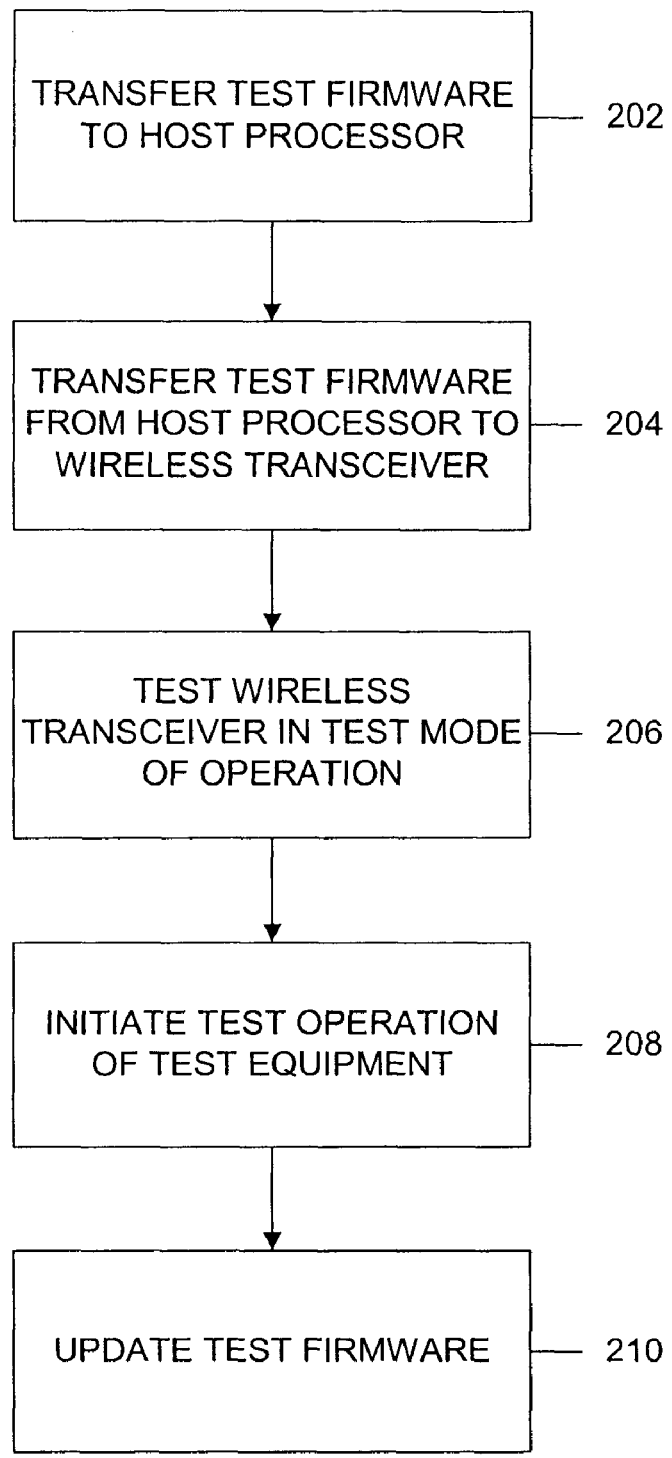
FIG. 2 depicts a method for testing the wireless data communication system of FIG. 1 in accordance with one embodiment of the presently claimed invention.

Referring to FIG. 2, one example of this method can be depicted as shown. In the first step 202, the test firmware is transferred to the host processor 110, generally by the control computer 150. In the next step 204, the test firmware is transferred from the host processor 110 to the wireless transceiver 130 via the interface 111. It should be understood that the test firmware may be complete in that it also includes the desired test flow, or sequence, as an integral part. Alternatively, the test flow data can be transferred to the host processor 110 from the computer 150, and then relayed to the wireless transceiver 130. As a further alternative, the desired test flow data can be in the form of a data table previously stored in the memory 120, that can now be retrieved via the interface 121 and relayed by the host processor 110 to the wireless transceiver 130.

In the next step 206, the wireless transceiver 130 is set in a test mode of operation, i.e., where the wireless transceiver 130 will now await one or more commands from the test equipment 160 (discussed in more detail below), e.g., by listening for a command from the test equipment 160 on a predetermined frequency. Such setting of the wireless transceiver 130 in its test mode operation can be initiated automatically as part of the test firmware that has been loaded, or can be initiated by an appropriate command issued by the host processor 110. In the next step 208, test operation of the test equipment 160 is initiated, e.g., by sending the appropriate command for which the wireless transceiver 130 is listening, as noted. Alternatively, the wireless transceiver 130 can transmit a "ready" signal at a predetermined frequency, following the reception of which the test equipment 160 will begin sending one or more test commands. Preferably, the command set is minimal, e.g., only a NEXT type of command, thereby requiring only that the receiver watch for a good data packet (e.g., representing a NEXT command), and further thereby not requiring any media access control (MAC) layer operations. Following transmission of the initial test command from the test equipment 160, the wireless transceiver 130 preferably transmits an acknowledgement signal to indicate reception of such command, following which the main sequence of test commands from the test equipment 160 will begin. Controlling of the test equipment 160 is done under supervision by the control computer 150 via the interface 161.

A subsequent step 210 can include updating of the test firmware loaded into the wireless transceiver 130, whereby various operation settings, parameters or conditions can be modified based on data (e.g., transceiver calibration data) received from the control computer 150 via the host processor 110 or from a data table stored in the memory 120 conveyed via the host processor 110 to the wireless transceiver 130.

Figure 3:
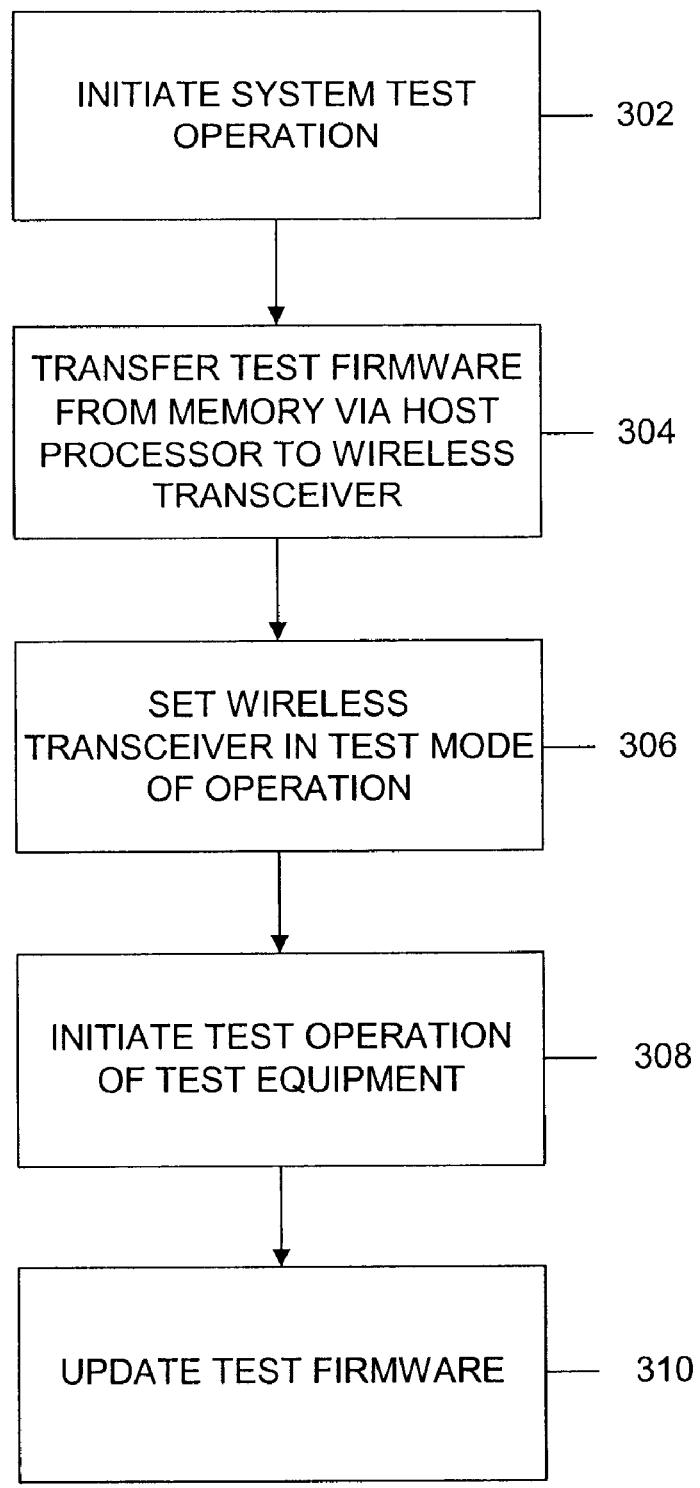
FIG. 3 depicts a method for testing the wireless data communication system of FIG. 1 in accordance with another embodiment of the presently claimed invention.

Referring to FIG. 3, a test method in accordance with another embodiment of the presently claimed invention has a first step 302 of initiating system test operation. This causes the host processor 110 to be prepared for the next step 304 in which the test firmware is transferred from the memory 120 via the host processor 110 to the wireless transceiver 130. As discussed above, the test firmware can include the test flow, or can also be composed of two components, i.e., the test commands and test sequence data. In the next step 306, the wireless transceiver 130 is set in its test mode of operation. As discussed above, this can be done automatically as part of the loading of the test firmware, or can be initiated by an appropriate command sent by the host processor 110 via the interface 111, with such command either initiated by the host processor 110 or conveyed by the host processor 110 in response to its reception from the computer 150.

In the next step 308, actual testing is initiated. As discussed above, this can be in the form of either the wireless transceiver 130 initiating communication with the test equipment 160 over the interface 101, or the test equipment 160, under the control of the computer 150, initiating communication with the wireless transceiver 130 via the interface 101.

Subsequent steps can include a step 310 in which the test firmware is updated, as discussed above, to modify various test settings, parameters or conditions.

As discussed above, a test method in accordance with the present disclosure includes steps for placing the DUT 100 in a test operation mode in conjunction with the external test equipment 160. Following that, there are two general categories of testing: testing of the signal transmit function of the wireless transceiver 130; and testing of the signal reception function of the wireless transceiver 130.

Figure 4:
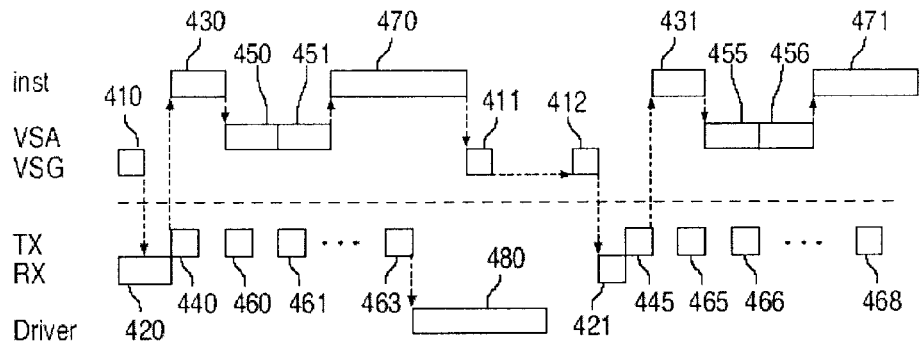
FIG. 4 depicts a test sequence for performing signal transmission testing of the wireless data communication system of FIG. 1 in accordance with one embodiment of the presently claimed invention.

Referring to FIG. 4, one example of a transmit test sequence can be described as follows. Testing begins with the receiver (RX) portion of the DUT 100 awaiting a command 420. The test equipment 160 issues its command 410 (e.g., a GOTO-NEXT command). Following reception of this command, the transmitter (TX) of the DUT 100 transmits an acknowledgment signal 440 indicating it received and understood the command. Following this, the DUT 100 begins transmitting data signals as determined by the test flow. This is represented by signal transmission time slots 460, 461, . . . 463. The test flow will determine the number of packets to be transmitted, with such transmitted packets containing the same signal, or multiple signals in the case of a multi-packet transmission.

Following receipt of the acknowledgement 440, the test equipment 160 will wait for a specified time interval 430 to allow the transmitter to settle to its desired operation (e.g., frequency accuracy and power level). Following this time interval 430, the test equipment 160 begins performing measurements 450, 451. Following completion of these measurements 450, 451, the test equipment 160, or alternatively the controller computer 150, after having accessed the data collected by the test equipment 160, analyzes the collected data and prepares to set up the next test sequence 470. Similarly, following completion of its signal transmissions 463, the DUT 100 will prepare for the next portion of the test sequence by processing any necessary operations 480.

When the test equipment 160 or computer 150 has completed processing of the data 470, the next test command (e.g., GOTO-NEXT) is transmitted. The first of such commands 411 may not be received by the DUT 100 if its preparations 480 for the next test have not yet been completed. If so, no acknowledgement signal is received by the test equipment 160. Accordingly, the test equipment 160 will continue to send its commands 412, following which at some point in time one of these commands 412 will be received 421 by the DUT 100 and an acknowledgement 445 will be transmitted by the DUT 100. This will be the start of a new test sequence where the DUT 100 will transmit a new test signal a known number of times 465, 466, . . . 468, and the test equipment 160 will perform the desired measurements 455, 456, followed by further analysis and preparation for subsequent testing 471.

It should be understood that, although unusual in a production test environment, the test equipment 160 may not receive good data from the DUT 100. While this is generally an indication of a bad DUT 100, it may be desirable to repeat the failed test before simply discarding the DUT 100. In such a situation, two possible courses of action exist. According to one, the test equipment 160 can send a different command (e.g., a REPEAT command rather than a GOTO-NEXT command). This is a simple implementation and should be easy for the DUT 100 to identify this different command. However, this can slow testing down as the test equipment 160 may need to load a new command or new data to enable the generation of a new signal. Alternatively, the test equipment 160 can simply not send another command, following which the DUT 100 can interpret this as an indication that the measurement was not successful, in which case the DUT 100 simply repeats the original test.

As noted above, the transmit signals 460, 461, . . . 463, being sent by the DUT 100 can be a single transmit signal, or can be a set of multi-packet signals. Using such multi-packet signals has an advantage that little or no communication is needed between the test equipment 160 and the DUT 100 during calibration, since a solution is generally reached by iteration, as discussed in U.S. patent application Ser. No. 11/161,692, filed Aug. 12, 2005, and entitled "Method for Measuring Multiple Parameters of a Signal Transmitted by a Signal Generator," the disclosure of which is herein incorporated in its entirety by reference.

Figure 5:
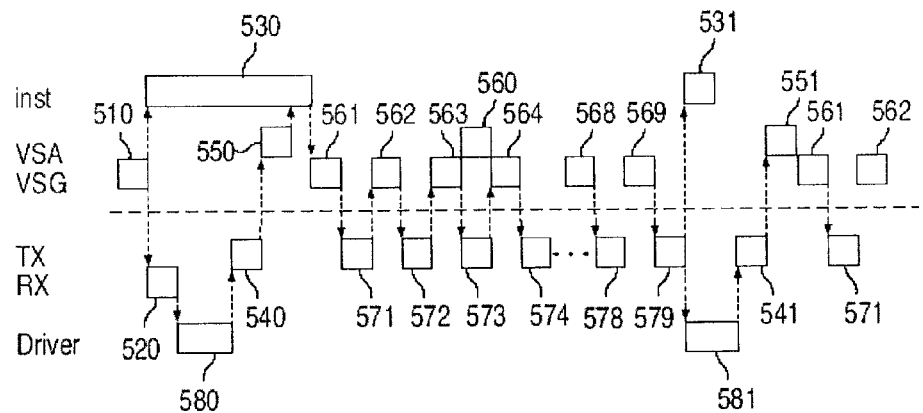
FIG. 5 depicts a test sequence for performing signal reception testing of the wireless data communication system of FIG. 1 in accordance with another embodiment of the presently claimed invention.

Referring to FIG. 5, the expected test flow for receiving signals can be described as follows. This test flow differs from the signal transmission test flow in that it is intended to implement the test such that the DUT 100 need not fully analyze (if at all) the data actually being received from the test equipment 160, but rather simply determine if a valid packet has been received. Accordingly, the test equipment 160 need not issue a test command (e.g., a GOTO-NEXT command) when transitioning from one received test to another. Instead, it is preferable to let the DUT 100 determine when to move on to the next test. This can be done by simply having the DUT 100 continue to the next test when the DUT has received a pre-determined number of good signal packets.

If the DUT 100 transmits an acknowledgement whenever it has received a good packet, the test equipment 160 can simply count the number of good packets without requesting such count from the DUT 100, thereby allowing the received signal test flow to progress without additional communications being necessary to simply determine the results of the test, since the test equipment 160 knows how many packets were sent and can determine how many were received by simply counting the number of acknowledgement signals received form the DUT 100. This technique is particularly valid where the test equipment 160 includes test equipment like the VSA and VSG because it is unlikely to have lost acknowledgement signals since the transmitter power of the DUT 100 is generally higher than the transmitter power of the VSG. Hence, it is unlikely that the VSA will miss an acknowledgement signal packet, particularly if the VSA is triggered by the trailing edge of the signal packet transmitted by the VSG. Further, having the VSA receive the acknowledgement packet provides the additional benefit of allowing the switching time of the transmit/receive switch in the DUT 100 to be tested as well.

Referring again to FIG. 5, the test equipment 160 transmits the test command 510. Assuming the previous test was a transmit test, this test command 510 instructs the DUT 100 to initiate the next test which is a receive test. The DUT 100 receives this command 520, which causes the test firmware to enable the receive test 580. When the receiver section of the DUT 100 is ready, an acknowledgement signal is transmitted 540, indicating the readiness of the receiver. This can be important as compared to conventional test methods where packets are sent by the test equipment 160 until the receiver starts receiving such packets. By having the DUT 100 indicate its readiness, the test equipment 160 need only enable its VSA to await reception of the acknowledgment signal from the DUT 100, following which the test equipment 160 can then prepare for receive testing 530.

When the test equipment 160 (e.g., the VSA) receives the acknowledgement signal 540, the test equipment 160 knows that the DUT 100 is ready and begins signal transmission. Accordingly, the test equipment 160 (e.g., the VSG) begins transmitting a predetermined number of signal packets 561, 562, 563, 564, 568, 569, each of which produces a corresponding acknowledgement signal 571, 572, 573, 574, 578, 579. The test equipment 160 receives these acknowledgement packets and increases its internal count for each such packet received. Additionally, as noted above, the transmit/receive switch operation of the DUT 100 can be analyzed by analyzing an interval 560 between a transmitted test signal 563 and the reception of an acknowledgement signal 573. (Using an acknowledgement signal in this manner is advantageous since such a signal is already included in virtually all standard or default transceiver signal sets, thereby avoiding a need for adding another otherwise unnecessary signal or functionality.)

In this example, no packet errors have occurred, so the DUT 100 has received the predetermined number of packets and will move on to the next receive test 581. Similarly, the test equipment 160 knows that the DUT 100 has received all packets based upon the received number of acknowledgement signals and can prepare for the next receive test 531 as well. When the DUT 100 is prepared, an acknowledgement signal is transmitted 541 indicating such readiness, and the test equipment 160, following reception of this acknowledgement 551, begins to transmit packets for the next test 561. In the event that the DUT 100 has not received packets within a predetermined time interval, it can retransmit its acknowledgement 541, e.g., where the DUT 100 becomes ready faster than the test equipment 160 for the next test.

Figure 6:
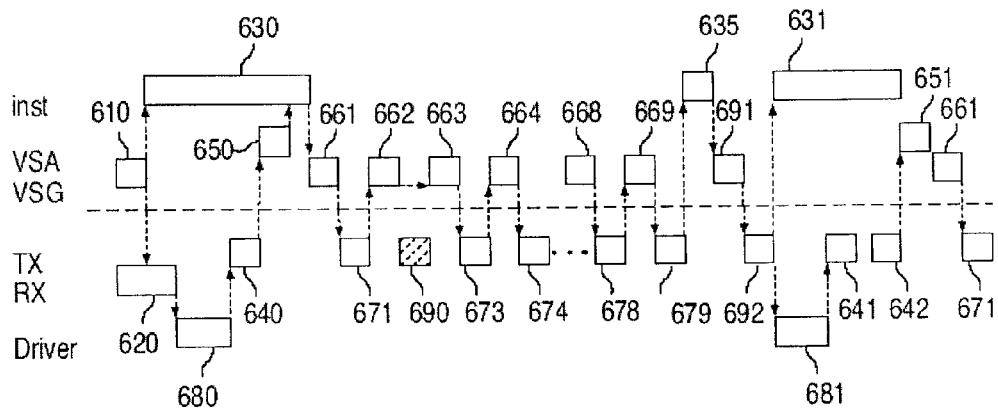
FIG. 6 depicts a test sequence for performing signal reception testing of the wireless data communication system of FIG. 1 in accordance with another embodiment of the presently claimed invention.

Referring to FIG. 6, if a packet error is encountered, the DUT 100 does not receive its full predetermined number of good packets. As shown, the test flow begins from where the previous test was a transmit test. The VSG of the test equipment 160 sends the test command 610 indicating the start of the new operation or the end of the previous operation. The DUT 100 receives this command 620 and prepares to enable itself for receive testing 680. When it is ready, the DUT 100 sends its acknowledgement that it is ready to receive 640. This acknowledgement is received 650 by the test equipment 160, following which when the test equipment 160 is ready, e.g., completing its internal setup 630, it begins transmitting the predetermined number of packets 661, 662, 663, 664, 668, 669. In response to this, the DUT 100 transmits an acknowledgement 671, 673, 674, 678, 679 for each of the good packets it has received.

As shown, one of the packets 662 was not received by the DUT 100. Accordingly, no corresponding acknowledgement was transmitted by the DUT 100 as illustrated by an empty received packet 690 in the FIG. Following completion of the transmit sequence, the test equipment 160 knows how many acknowledgement packets it received, and since one packet was apparently missed 690, the test equipment 160 knows that the receiver of the DUT 100 is still awaiting at least one more packet before it can continue to the next test in the test flow. Accordingly, the test equipment 160 will compute 635 the number of additional packets needed to be received by the DUT 100, and begin transmitting 691 the necessary number of packets.

Following reception of this missing packet, the DUT 100 transmits an acknowledgement signal 692, and begins preparing for the next test operation 681. When it is ready, the DUT 100 will send another acknowledgement to the test equipment 160. In this example, the test equipment 160 is not yet ready when the DUT 100 is ready. Accordingly, the DUT 100 sends it acknowledgement signal 641, but since the test equipment 160 is not yet ready and does not respond, the DUT 100, after a predetermined time interval, will send another acknowledgement signal 642. The test equipment 160 is now ready and following reception of this acknowledgement signal 651 begins to transmit more data packets 661, to which the DUT 100 responds by sending corresponding acknowledgement packets 671.

As discussed above, the signals being transmitted for testing purposes can be multi-packet signals, in which case it may be desirable to have the DUT 100 respond only to certain types of data packets. For example, transmitting different data packets at different power levels can allow testing of actual receiver sensitivity to be performed (where certain packets are expected to not be received) without requiring the transmitter to send many more packets to make the receiver meet the desired packet number for progression to the next test.

Figure 7:
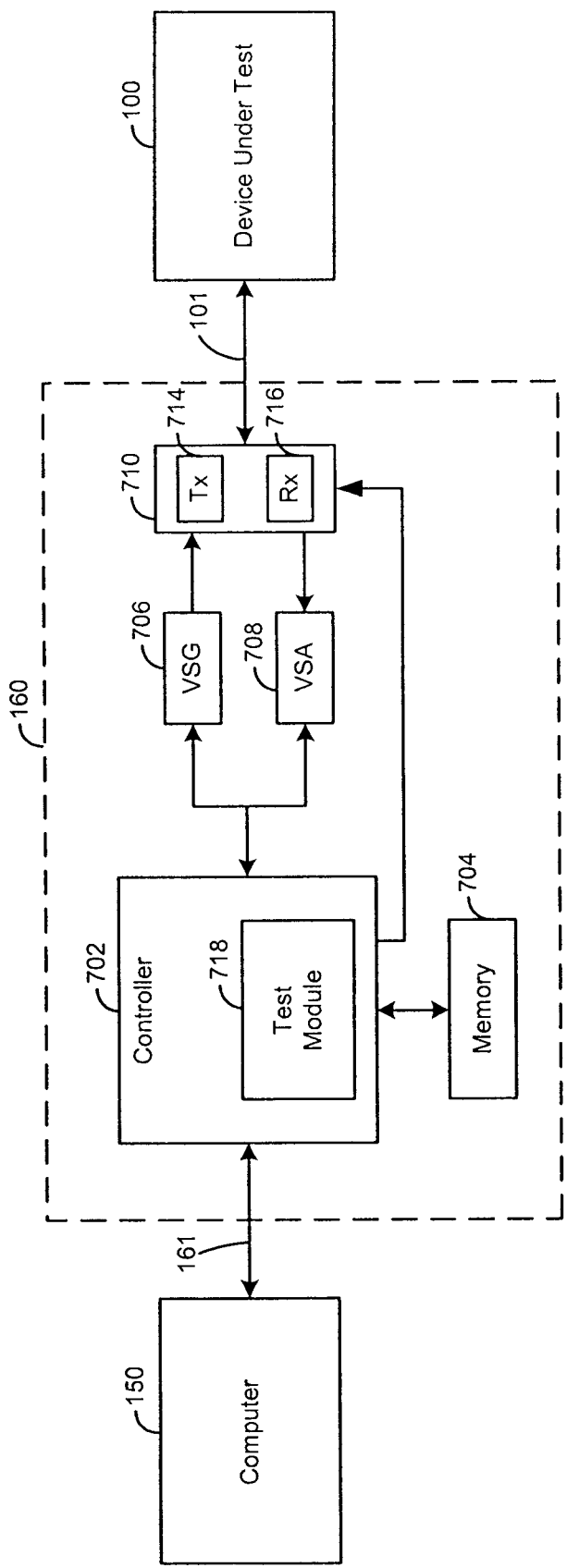
FIG. 7 is an exemplary functional block diagram of test equipment according to the present disclosure.

Referring now to FIG. 7, an exemplary functional block diagram of the test equipment 160 is depicted. The test equipment 160 includes a controller 702, memory 704 (e.g., non-volatile memory), a VSG 706, a VSA 708, and a wireless transceiver 710. The controller 702 is operatively coupled to the VSG 706, the VSA 708, memory 704, the transceiver 710, and the computer 150. The VSG 706 and VSA 708 are operatively coupled to the transceiver 710. More specifically, the VSG 706 is operatively coupled to a transmitter 714 of the transceiver 710 and the VSA 708 is operatively coupled to a receiver 716 of the transceiver 710. The controller 702 includes a test module 218 that controls testing of the DUT 100. For example, the test module 218 can perform a receive signal strength indicator (RSSI) calibration test and subsequently perform a sensitivity test of the wireless transceiver 130.

During the RSSI calibration test, the test equipment 160 transmits one or more packets at a first power level to the DUT 100. In response to the one or more packets, the DUT 100 transmits a power level indicator to the test equipment 160, which the controller 702 stores in memory 704. In some embodiments, the power level indicator indicates whether the RSSI of the one or more packets is greater than a predetermined threshold or less than the predetermined threshold. In other embodiments, the power level indicator represents the RSSI of the one or more packets.

The test equipment 160 transmits one or more packets at a second power level. In some embodiments, the controller 702 periodically increases or decreases a transmit power of the transceiver 710 until a predetermined test sequence is complete. For example, when the controller 702 periodically decreases the transmit power, the second power level is less than the first power level. However, when the controller 702 periodically increases the transmit power, the second power level is greater than the first power level. In other embodiments, the second power level is based on the power level indicator. For example, if the power level indicator indicates that the first power level is greater than the predetermined threshold, the second power level is less than the first power level. However, if the power level indicator indicates that the first power level is less than the predetermined threshold, the second power level is greater than the first power level. In this manner, the test equipment 160 searches for a calibration power level that is required for the DUT 100 to receive the one or more packets.

In some embodiments, the test equipment 160 determines an RSSI calibration offset based on the first power level, the second power level, and/or the power level indicator, which is used to calibrate the wireless transceiver 130. In other embodiments, the test equipment 160 stores the first power level, the second power level, and/or the power level indicator in memory 704, which is subsequently transferred to an analysis system such as the computer 150 for later analysis.

Rather than transmitting one or more packets to perform the RSSI calibration test, the test equipment 160 can alternatively transmit a first predetermined series of packets (e.g., a first predetermined sequence) at the first power level to the DUT 100. In response to each of the first series of packets, the DUT 100 transmits an acknowledgement packet to the test equipment 160. The DUT 100 sends the power level indicator after transmitting a predetermined number of acknowledgment packets. After receiving the power level indicator from the DUT 100, the test equipment 160 transmits a second predetermined series of packets (e.g., a second predetermined sequence) at the second power level. In this manner, the test equipment 160 searches for the calibration power level that is required for the DUT 100 based on the predetermined series of packets (e.g., predetermined sequence).

As previously noted, in some embodiments, the power level indicator represents the RSSI of the packets. In these embodiments, the test equipment 160 can transmit a single predetermined series of packets (e.g., a predetermined sequence) at a predetermined power level to the DUT 100. In response to each of the predetermined series of packets, the DUT 100 transmits an acknowledgement packet to the test equipment 160. After transmitting a predetermined number of acknowledgment packets, the DUT 100 sends power level indicator that represents RSSI of at least one of the predetermined series of packets. For example, the RSSI can be encoded in the power level indicator. Alternatively, the power level indicator can include a plurality of power level packets (not shown) that indicate the RSSI. For example, if the power level indicator includes 44 power level packets, the evaluated signal strength can be −60 dBm. Although 44 power level packets are used in this example to represent an evaluated signal strength of −60 dBm, skilled artisans will appreciate that any number of power level packets can be used to represent the evaluated signal strength.

Since the test equipment 160 expects to receive a predetermined number of total packets (e.g., 60 total packets) indicating the RSSI, the power level indicator can also include additional filler packets (not shown) (e.g., 16 packets) that do not indicate the RSSI so that the same number of packets are included in each power level indicator. Once the test equipment 160 has received all of the predetermined number of total packets (e.g., 44 power level packets and 16 filler packets), the test equipment 160 can finish the RSSI test and proceed to the sensitivity test.

During the sensitivity test, which is generally performed subsequent to the RSSI calibration test, the controller 702 sets the transmitter 714 to operate in at least a first and second mode. For example, in some embodiments, the transmitter 714 transmits at a first power level when operating in the first mode and transmits at a second power level when operating in the second mode. In other embodiments, the transmitter 714 transmits using a first modulation technique when operating in the first mode and a second modulation technique when operating in the second mode. In still other embodiments, the transmitter 714 transmits at a first data rate when operating in the first mode and a second data rate when operating in the second mode.

When the transceiver 710 is operating in the first mode, the controller 702 controls the transceiver 710 to transmit a series packets separated by a time interval to the DUT 100. In response to receiving each of the series of packets, the DUT 100 transmits an acknowledgement packet to the test equipment 160. The controller 702 counts acknowledgment packets received by the transceiver 710 in response to transmitting each of the series of packets.

When the number of acknowledgment packets exceed a predetermined count, the controller 702 sets the transceiver 710 to operate in the second mode and subsequently controls the transceiver 710 to transmit a second series of packets. In some embodiments, the test equipment 160 determines a packet error rate (PER) based on how many packets were transmitted and how many acknowledgement packets were received from the DUT 100. In other embodiments, the number of transmitted packets and acknowledgment packets are stored in memory 704, which are subsequently transferred to analysis system such as the computer 150 for later analysis.

The controller 702 can periodically decrease a power transmission level of transceiver 710 until the DUT 100 stops transmitting acknowledgment packets in response to transmitting the series of packets. Alternatively, the controller 702 can periodically increase the power level of the transceiver 710 until the DUT 100 starts transmitting acknowledgment packets in response to the series of packets.

In some embodiments, the test equipment 160 determines a sensitivity of the wireless transceiver 130 based on the acknowledgment packets received and the power level at which the packets were transmitted. In other embodiments, the test equipment 160 stores the test results in memory 704, which are subsequently transferred to the computer 150 for later analysis.

Figure 8:
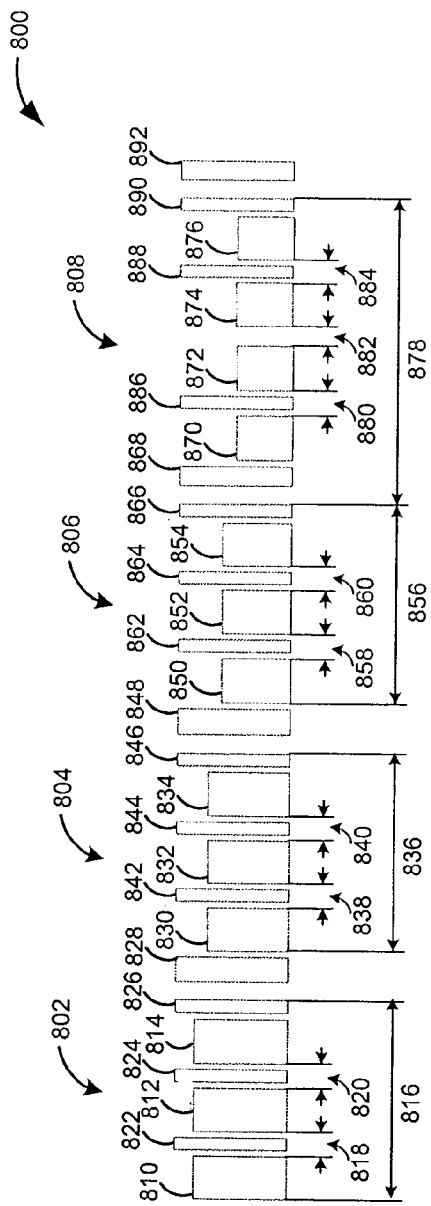
FIG. 8 is an exemplary timing diagram of the test equipment performing a receive signal strength indication (RSSI) calibration test.

Referring now to FIG. 8, an exemplary timing diagram of the test equipment 160 performing the RSSI calibration test is generally depicted at 800. In this example, the RSSI calibration test includes four predetermined sequences generally identified at 802, 804, 806, and 808. Although this example illustrates four predetermined sequences, skilled artisans will appreciate that more or less sequences can be used. During the first sequence 802, the test equipment 160 transmits a first series of packets 810, 812, and 814 during time interval 816 to the DUT 100. Each packet 810, 812, and 814 is separated by a time interval. More specifically, packets 810 and 812 are separated by time interval 818 and packets 812 and 814 are separated by time interval 820. In response to receiving each of the first series of packets 810, 812, and 814, the DUT 100 transmits acknowledgement packets 822, 824, and 826, respectively.

After the DUT 100 transmits a predetermined number of acknowledgment packets (three in this example), the DUT 100 evaluates a signal strength of the first series of packets 810, 812, 814. The signal strength can be based on one or more of the first series of packets 810, 812, 814. For example, the signal strength can be based on a high energy value, a low energy value, and/or an average energy value of the first series of packets 810, 812, 814.

After evaluating the signal strength, the DUT 100 transmits a power level indicator 828 based on the signal strength to the test equipment 160. In some embodiments, the power level indicator 828 indicates whether the evaluated signal strength of the first series of packets is either greater than a predetermined threshold or less than the predetermined threshold. For example, when the evaluated signal strength is greater than the predetermined threshold, the power level indicator can include a packet having a longer time duration than when the evaluated signal strength is less than the predetermined threshold or vice versa.

In response to receiving the power level indicator 828, the controller 702 adjusts a power level of the transmitter 714 to a second power level. As previously noted, in some embodiments, the controller 702 periodically decreases (or increases) the power level for each of the predetermined sequences 802, 804, 806, 808. In other embodiments, the power level is adjusted based on the power level indicator 828. For example, if the power level indicator 828 indicates that the signal strength of the first series of packets 810, 812, 814 is greater than the predetermined threshold, the power level of the transmitter 160 is decreased.

During the second sequence 804, the test equipment 160 transmits a second series of packets 830, 832, and 834 to the DUT 100. The second series of packets 830, 832, 834 are transmitted at the second power level during time interval 836. Packets 830 and 832 are separated by time interval 838. Packets 832 and 834 are separated by time interval 840. In response to receiving each of the second series of packets 830, 832, and 834, the DUT 100 transmits acknowledgement packets 842, 844, and 846, respectively.

After the DUT 100 transmits a predetermined number of acknowledgment packets (three in this example), the DUT 100 evaluates a signal strength of the second series of packets 830, 832, 834. The DUT 100 transmits a power level indicator 848 based on the signal strength to the test equipment 160. In response to receiving the power level indicator 848, the controller 702 adjusts the power level of the transmitter 714 to a third power level. As previously noted, in some embodiments, the controller 702 periodically decreases (or increases) the power level for each of the predetermined sequences 802, 804, 806, 808. In other embodiments, the power level is adjusted based on the power level indicator 848. For example, if the power level indicator 858 indicates that the signal strength of the second series of packets 830, 832, 834 is less than the predetermined threshold, the power level of the transmitter 160 is decreased.

During the third sequence 806, the test equipment 160 transmits a third series of packets 850, 852, and 854 to the DUT 100. The third series of packets 850, 852, 854 are transmitted at the third power level during time interval 856. Packets 850 and 852 are separated by time interval 858. Packets 852 and 854 are separated by time interval 860. In response to receiving each of the third series of packets 850, 852, and 854, the DUT 100 transmits acknowledgement packets 862, 864, and 866, respectively.

After the DUT 100 transmits a predetermined number of acknowledgment packets (three in this example), the DUT 100 evaluates a signal strength of the third series of packets 850, 852, 854. The DUT 100 transmits a power level indicator 868 based on the signal strength to the test equipment 160. In response to receiving the power level indicator 868, the controller 702 adjusts the power level of the transmitter 714 a fourth power level.

During the fourth sequence 806, the test equipment 160 transmits a fourth series of packets 870, 872, 874, and 876 to the DUT 100. The fourth series of packets 870, 872, 874, 876 are transmitted at the fourth power level during time interval 878. Packets 870 and 872 are separated by time interval 880. Packets 872 and 874 are separated by time interval 882. Packets 874 and 876 are separated by time interval 884. In response to receiving three of the fourth series of packets 870, 874, and 876, the DUT 100 transmits acknowledgement packets 886, 888, and 890, respectively. In this example, the DUT 100 did not receive packet 872 and therefore did not transmit an acknowledgment packet.

After the DUT 100 transmits a predetermined number of acknowledgment packets (three in this example), the DUT 100 evaluates a signal strength of the fourth series of packets 870, 874, 876. The DUT 100 transmits a power level indicator 892 based on the signal strength to the test equipment 160. In response to receiving the power level indicator 892, the test equipment 160 calculates an RSSI calibration offset to calibrate the wireless transceiver 130 based on the first through fourth power levels and/or the power level indicators 828, 848, 868, 892. Alternatively, the test equipment 160 can store the test results in memory 704, which are subsequently transferred to an analysis system such as the computer 150 for later analysis.

Figure 9:
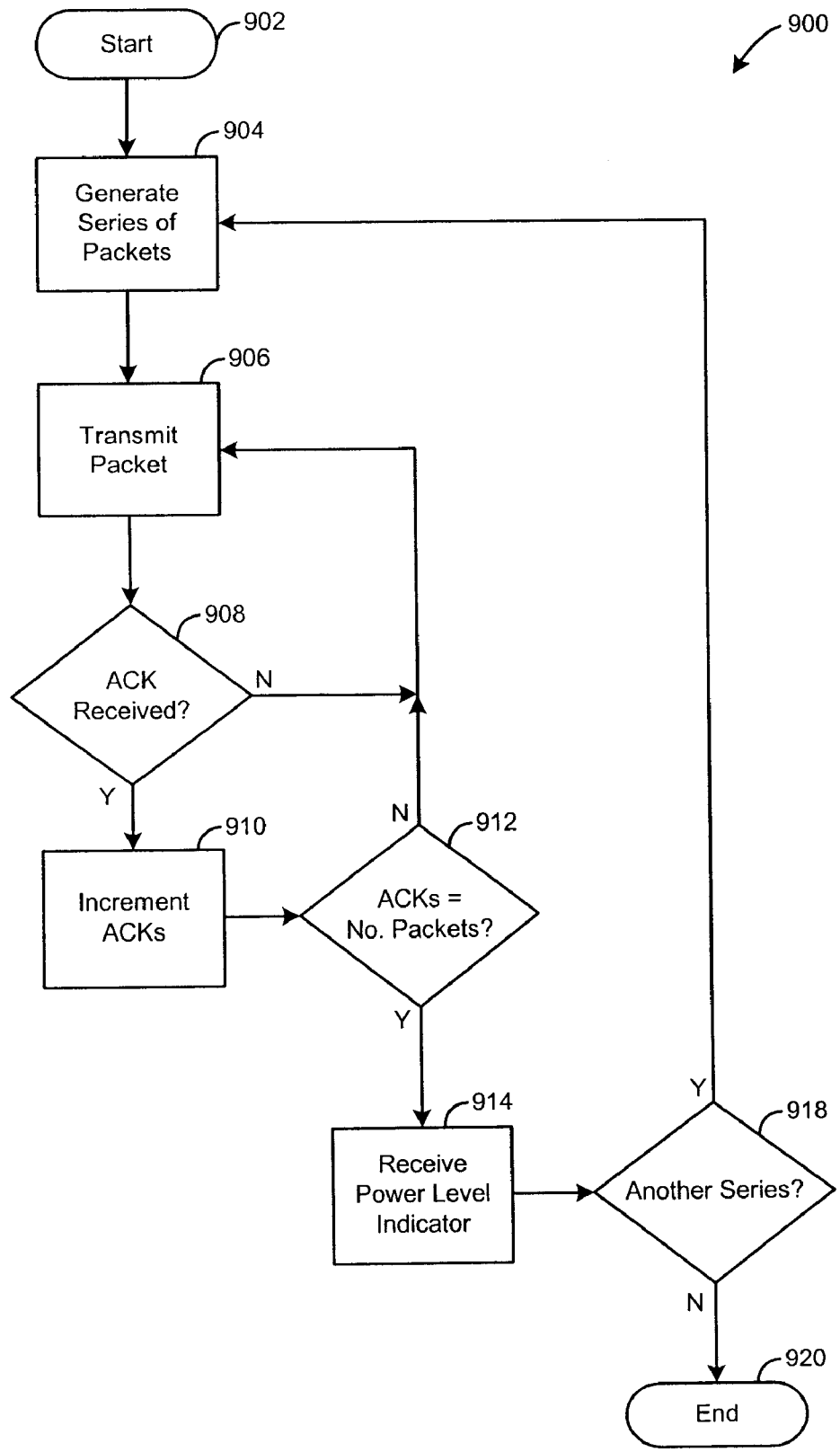
FIG. 9 is a flowchart depicting exemplary steps that can be taken by the test equipment while performing the RSSI calibration test.

Referring now to FIG. 9, exemplary steps that can be taken by the controller 702 during the RSSI calibration test are generally identified at 900. The process starts in step 902. In step 904, the test equipment 160 generates a predetermined series of packets to perform the RSSI calibration test. In step 906, the test equipment 160 transmits a single packet of the series of packets. In step 908, the test equipment 160 determines whether an acknowledgment packet was received in response to transmitting the single packet. If an acknowledgment packet was not received, the test equipment 160 transmits the packet again in step 906. If an acknowledgment packet was received in step 908, the test equipment 160 increments an acknowledgment packet count in step 910.

In step 912, the test equipment 160 determines whether the acknowledgment packet count is equal to the predetermined number of acknowledgment packets. If the acknowledgment packet count is not equal to the predetermined number of acknowledgment packets, the process returns to step 906.

However, if the acknowledgment packet count is equal to the predetermined number of acknowledgment packets, the test equipment 160 receives a power level indicator in step 914.

In step 918, the test equipment 160 determines whether another series of packets is required for the predetermined test flow. If another series of packets is required, the process returns to step 904 and the test equipment 160 generates another predetermined series of packets at a different power level. However, if there is not another series required for the predetermined test flow, the process ends in step 920.

Figure 10:
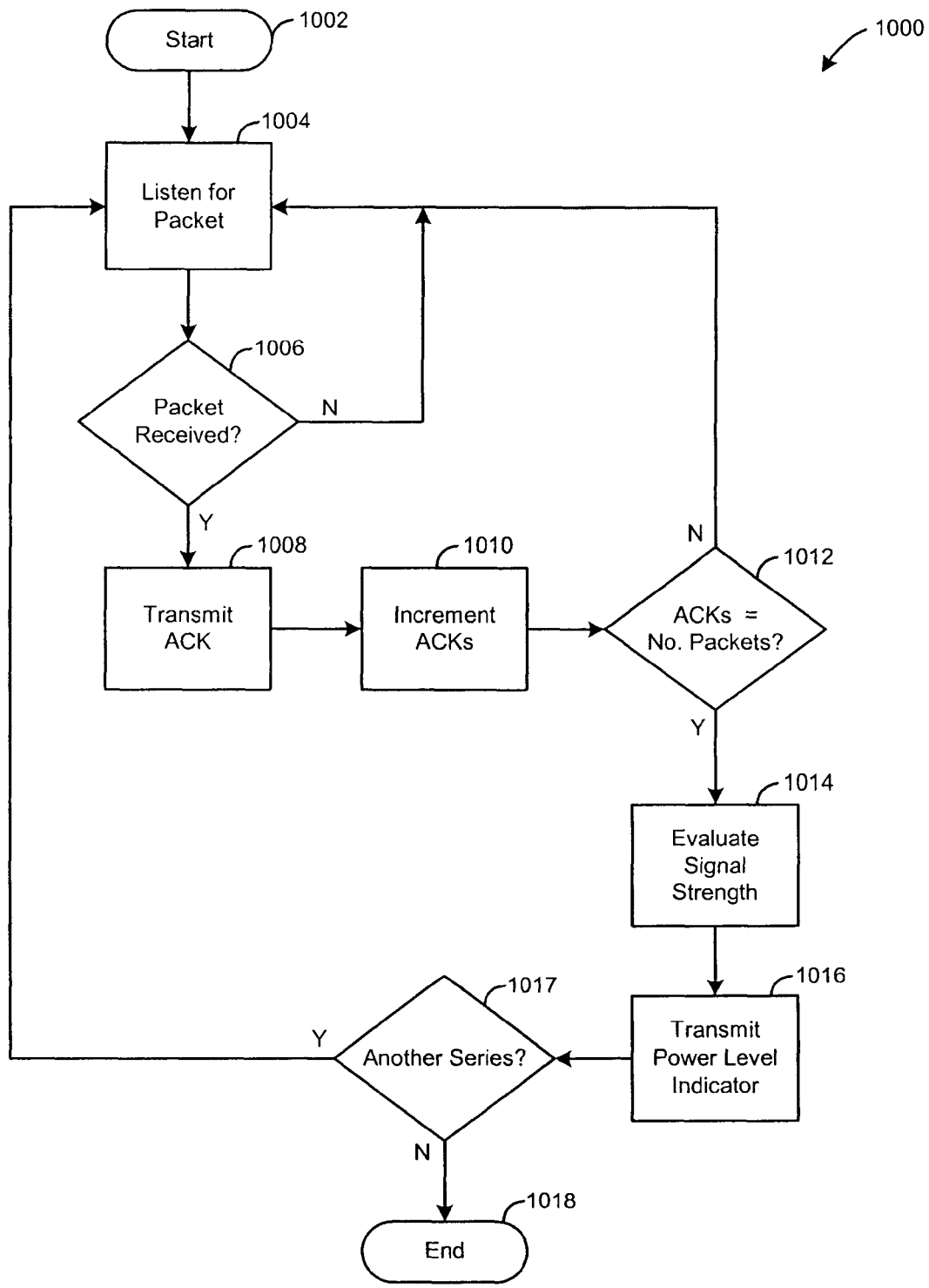
FIG. 10 is a flowchart depicting exemplary steps that can be taken by the wireless communication device.

Referring now to FIG. 10, exemplary steps that can be taken by the DUT 100 during the RSSI calibration test are generally identified at 1000. The process starts in step 1002. In step 1004, the DUT 100 listens for a packet to be transmitted from the test equipment 160. In step 1006, the DUT 100 determines whether a packet from the test equipment 160 has been received. If a packet has not been received, the process returns to step 1004. However, if a packet has been received, the DUT 100 transmits an acknowledgment packet in response to the packet in step 1008.

The DUT 100 increments an acknowledgment packet count in step 1010. In step 1012, the DUT 100 determines whether the acknowledgment packet count is equal to a predetermined number of packets for each series. If the acknowledgment packet count is not equal to the predetermined number of packets for each series, the process returns to step 1004. However, if the acknowledgment packet count is equal to the predetermined number of packets for each series, the DUT 100 evaluates a signal strength of the series of packets in step 1014. As previously discussed, the signal strength can be based on a high energy value, a low energy value, and/or an average energy value of each of the series of packets.

In step 1016, the DUT 100 transmits a power level indicator that indicates whether the signal strength is greater than a predetermined threshold or less than the predetermined threshold. The DUT 100 determines whether another series is required for the predetermined test flow in step 1017. If another series is required, the process returns to step 1004. However, if another series is not required for the predetermined test flow, the process ends in step 1018.

Figure 11:
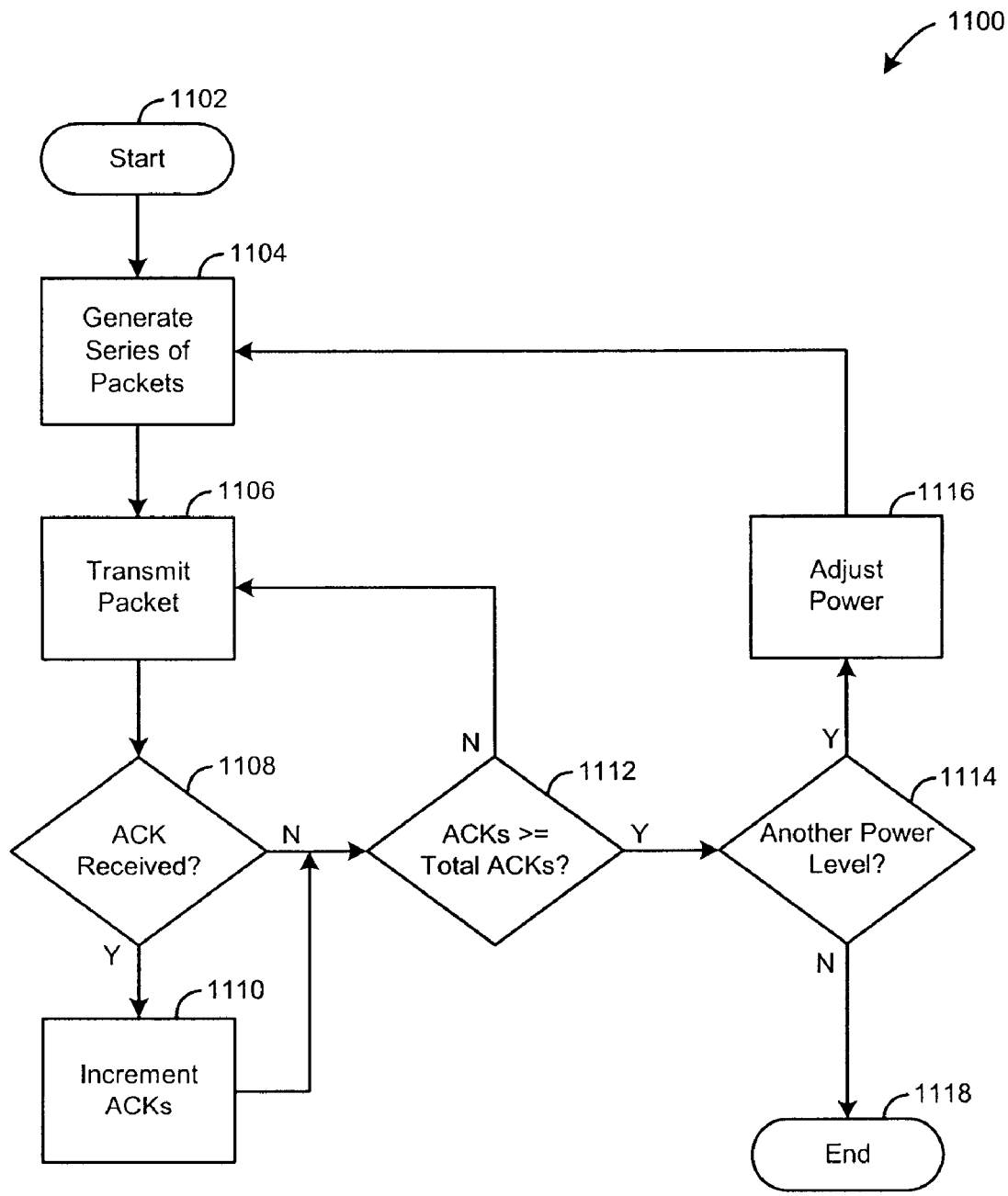
FIG. 11 is a flowchart depicting exemplary steps that can be taken by the test equipment while performing a sensitivity test.

Referring now to FIG. 11, exemplary steps that can be taken by the test equipment 160 during the sensitivity test, which are generally performed subsequent to the RSSI calibration test, are generally identified at 1100. The process starts in step 1102. In step 1104, the test equipment 160 generates a predetermined series of packets to test the sensitivity of the wireless transceiver 130. In step 1106, the test equipment 160 transmits a single packet of the series of packets.

The test equipment 160 determines whether an acknowledgment packet was received in response to transmitting the single packet in step 1108. If an acknowledgment packet was received, the test equipment 160 increments an acknowledgment packet count in step 1110 and proceeds to step 1112. However, if an acknowledgement packet was not received, the test equipment 160 simply proceeds to step 1112. In step 1112, the test equipment 160 determines whether the acknowledgment packet count is greater than or equal to the predetermined number of acknowledgment packets in step 1112.

If the acknowledgment packet count is not greater than or equal to the predetermined number of acknowledgment packets, the process returns to step 1106. However, if the acknowledgment packet count is greater than or equal to the predetermined number of acknowledgment packets, the test equipment 160 determines whether another power level is required to be tested to determine the sensitivity of the wireless transceiver 130 in step 1114. If another power level is required, the controller 702 adjusts the power level of the transmitter 714 in step 1116 and the process returns to step 1104. However, if another power level is not required, the process ends in step 1118.

Figure 12:
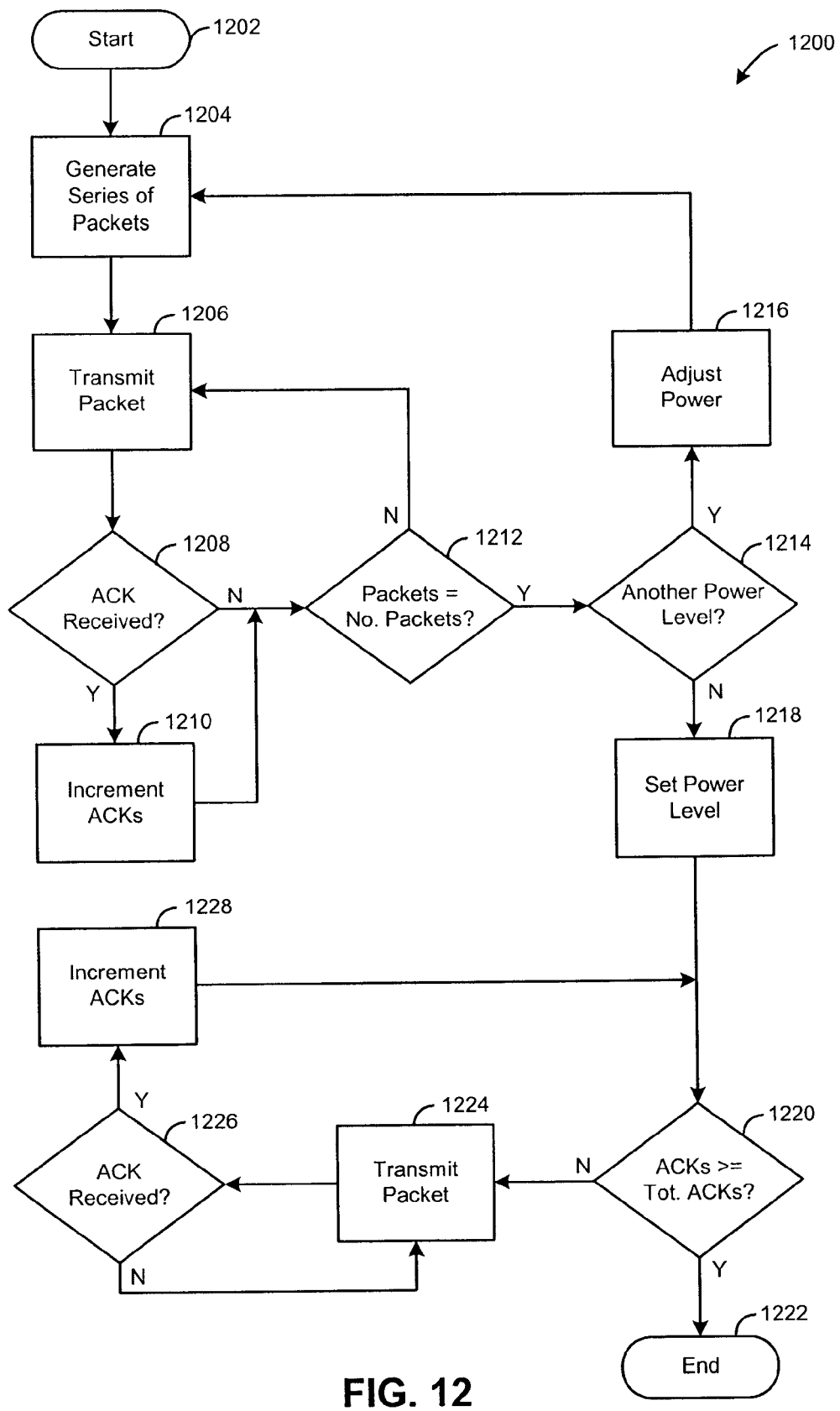
FIG. 12 is a flowchart depicting alternative exemplary steps that can be taken by the test equipment while performing the sensitivity test.

The DUT 100 expects to receive a predetermined number and/or series of test packets. Therefore, the DUT 100 remains in the test mode until it receives the predetermined number and/or series of test packets. In some cases, the power level of the transmitter 714 may be set too low for the DUT 100 to receive one or more packets from the test equipment 160. As a result, the DUT 100 may continue operating in the test mode since it cannot receive the predetermined number and/or series of test packets, which effectively increases the duration of the test. Therefore, alternative exemplary steps, which are generally identified at 1200 in FIG. 12, can be performed by the test equipment 160 to ensure that the DUT 100 receives the predetermined number and/or series of test packets. The alternative process ensures that the DUT 100 receives enough packets and/or series of packets to exit the test mode.

The process starts in step 1202. In step 1204, the test equipment 160 generates a predetermined series of packets to test the sensitivity of the wireless transceiver 130. In step 1206, the test equipment 160 transmits a single packet of the predetermined series of packets.

The test equipment 160 determines whether an acknowledgment packet was received in response to transmitting the single packet in step 1208. If an acknowledgment packet was received, the test equipment 160 increments an acknowledgment packet count in step 1210 and the process proceeds to step 1212. However, if an acknowledgment packet was not received, the test equipment 160 simply proceeds to step 1212. In step 1212, The test equipment 160 determines whether the number of packets transmitted is equal to the predetermined packets required for the test in step 1212.

If the number of packets transmitted is equal to the predetermined packets required for the test, the process returns to step 1206. However, if the acknowledgment packet count is equal to the predetermined number of acknowledgment packets, the test equipment 160 determines whether another power level is required to test the sensitivity of the wireless transceiver 130 in step 1214. If another power level is required, the controller 702 adjusts the power level of the transmitter 714 in step 1216 and the process returns to step 1204. However, if another power level is not required, the controller 702 sets the power level of the transmitter 714 to a predetermined power level that the DUT 100 is capable of receiving in step 1218. For example, if the power level is too low for the DUT 100 to receive a packet, the controller 702 may increase the power level of the transmitter 714 to the predetermined power level to ensure that the DUT 100 is capable of receiving one or more packets.

The test equipment 160 determines whether the acknowledgment packet count is greater than or equal to the predetermined number of acknowledgment packets in step 1220. If the acknowledgment packet count is greater than or equal to the predetermined number of acknowledgment packets, the process ends in step 1222. However, if the acknowledgment packet count is not greater than or equal to the predetermined number of acknowledgment packets, the test equipment 160 transmits a packet in step 1224.

The test equipment 160 determines whether an acknowledgment packet was received in response to transmitting the packet in step 1226. If an acknowledgment packet was received, the test equipment 160 increments the acknowledgment packet count in step 1228. However, if an acknowledgment packet was not received, the process returns to step 1224.

Figure 13:
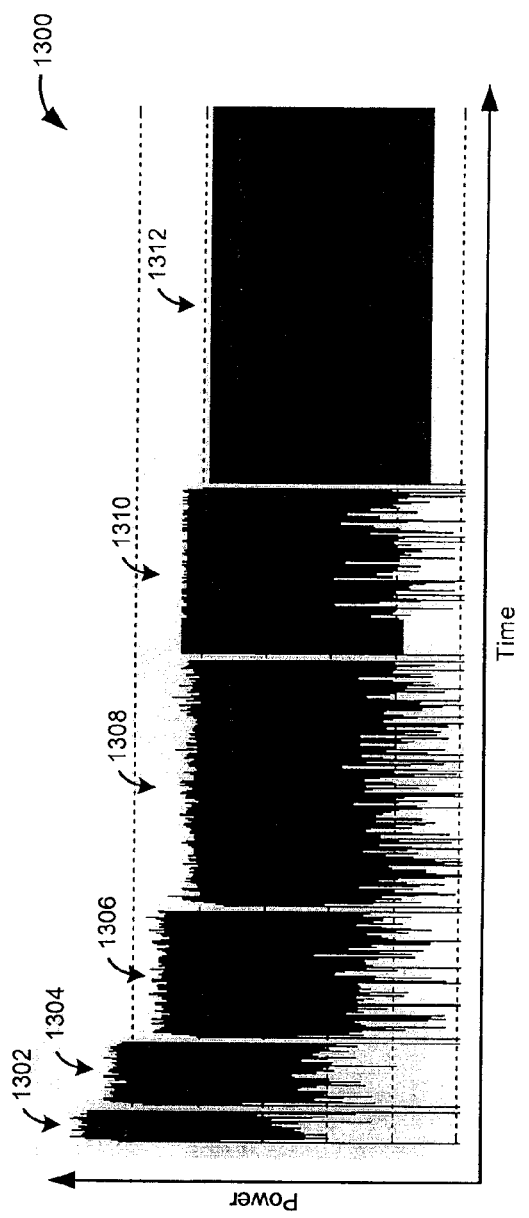
FIG. 13 is an exemplary timing diagram of the test equipment performing a sensitively test using varying transmit powers and modulation types.

In some embodiments, the test equipment 160 may additionally perform PER testing at multiple data rates using multiple modulation techniques. Referring to FIG. 13, an exemplary timing diagram of the test equipment 160 performing a sensitively test using varying transmit powers and modulation types is generally depicted at 1300. The example shows different IEEE 802.11 data packets modulated with the fundamental modulations. Packets 1302 are OFDM modulated QAM64 packets. Packets 1304 are OFDM modulated QAM16 packets. Packets 1306 are OFDM modulated QPSK packets. Packets 1308 are OFDM modulated BPSK packets. Packets 1310 are QPSK modulated CCK packets. Packets 1312 are BPSK modulated DSSS packets. As shown, each modulation technique results in a different power level.

Typically, in test equipment that does not support segmented memory a waveform for each packet type is loaded in memory individually. However, a single waveform such as that generally identified at 1300 can be loaded into memory to test all data rates. Therefore, loading a waveform such as that generally identified at 1300 is advantageous in test equipment that does not support segmented memory.

Figure 14:
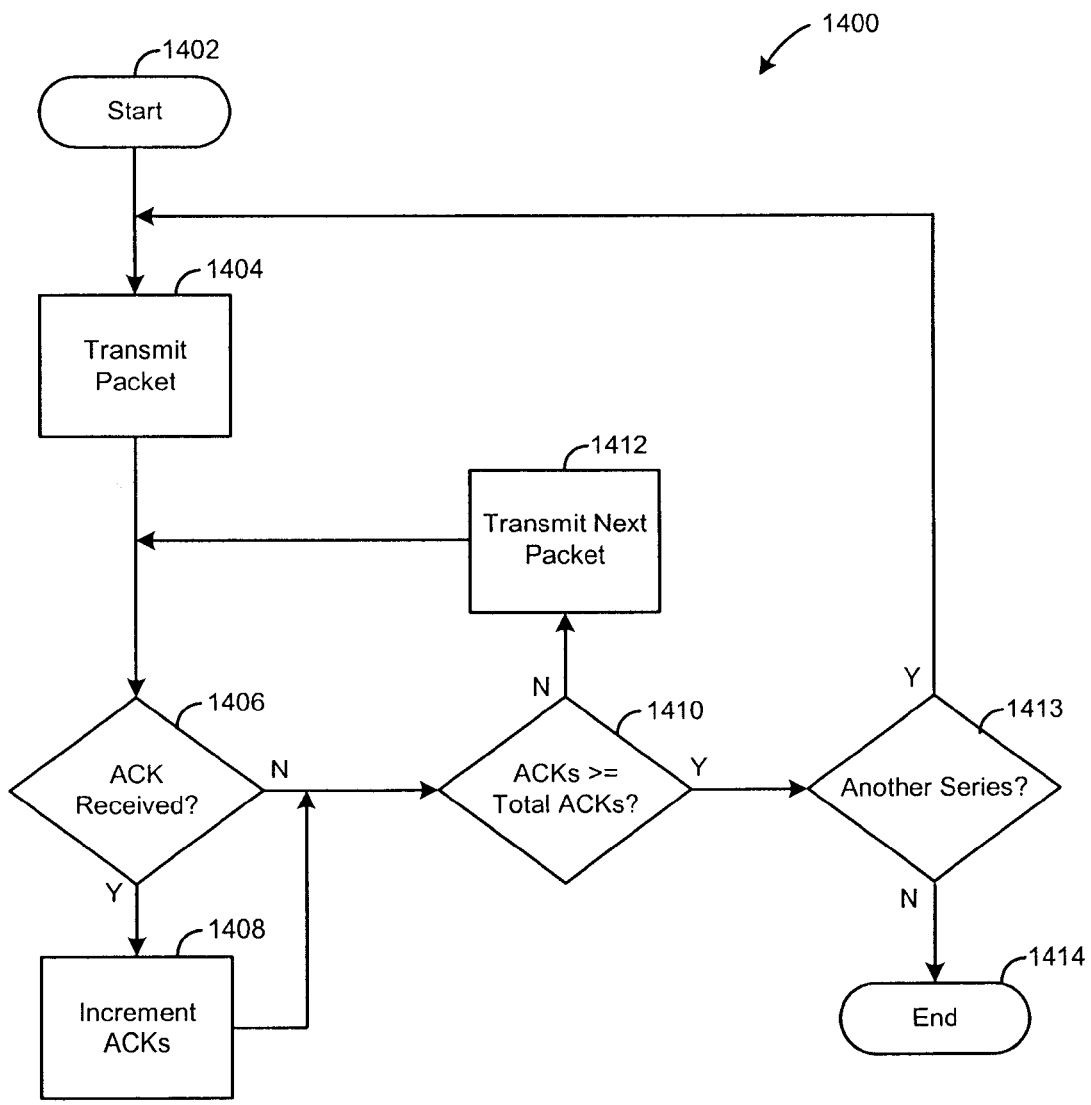
FIG. 14 is a flowchart depicting exemplary steps that can be taken by the test equipment while performing a sensitivity test using varying transmit powers and modulation types.

Referring now to FIG. 14, exemplary steps that can be taken by the test equipment 160 while performing a sensitivity test, for each series of packets (e.g., for each series of packets 1302, 1304, 1306, 1308, 1310, 1312) of the waveform 1300, using varying modulation techniques and/or data rates are generally identified at 1400. The process starts in step 1402 when the test is initialized. In step 1404, the test equipment 160 transmits a first packet of the waveform 1300 (e.g., a first packet of the packets 1302). In step 1406, the test equipment 160 determines whether an acknowledgment packet was received in response to transmitting the first packet. If an acknowledgment packet was received, the test equipment 160 increments an acknowledgment packet count (e.g., an acknowledgment packet count for packets 1302) in step 1408 and proceeds to step 1410. However, if an acknowledgment packet was not received, the test equipment 160 simply proceeds to step 1410.

In step 1410, the test equipment 160 determines whether the acknowledgment packet count is greater than or equal to the predetermined number of acknowledgment packets in step 1410. If the acknowledgment packet count is not greater than or equal to the predetermined number of acknowledgment packets, the test equipment 160 transmits the next packet in the waveform 1300 (e.g., a second packet of packets 1302) in step 1412 and the process returns to step 1406. However, if the acknowledgment packet count is equal to the predetermined number of acknowledgment packets, the test equipment 160 determines whether another series of packets (e.g., packets 1304) is included in the waveform 1300 in step 1413.

If another series of packets is included in the waveform 1300, the test equipment 160 transmits a first packet of the next series of packets in the waveform 1300 (e.g., a first packet of packets 1304) in step 1404. However, if another series of packets is not included in the waveform 1300 (e.g., the process has cycled through packets 1302-1312), the process ends in step 1414. In some embodiments, the test equipment 160 can reset a pointer to point to the first series packets (e.g., 1302) in the waveform 1300 when the process ends in step 1414.

Figure 15:
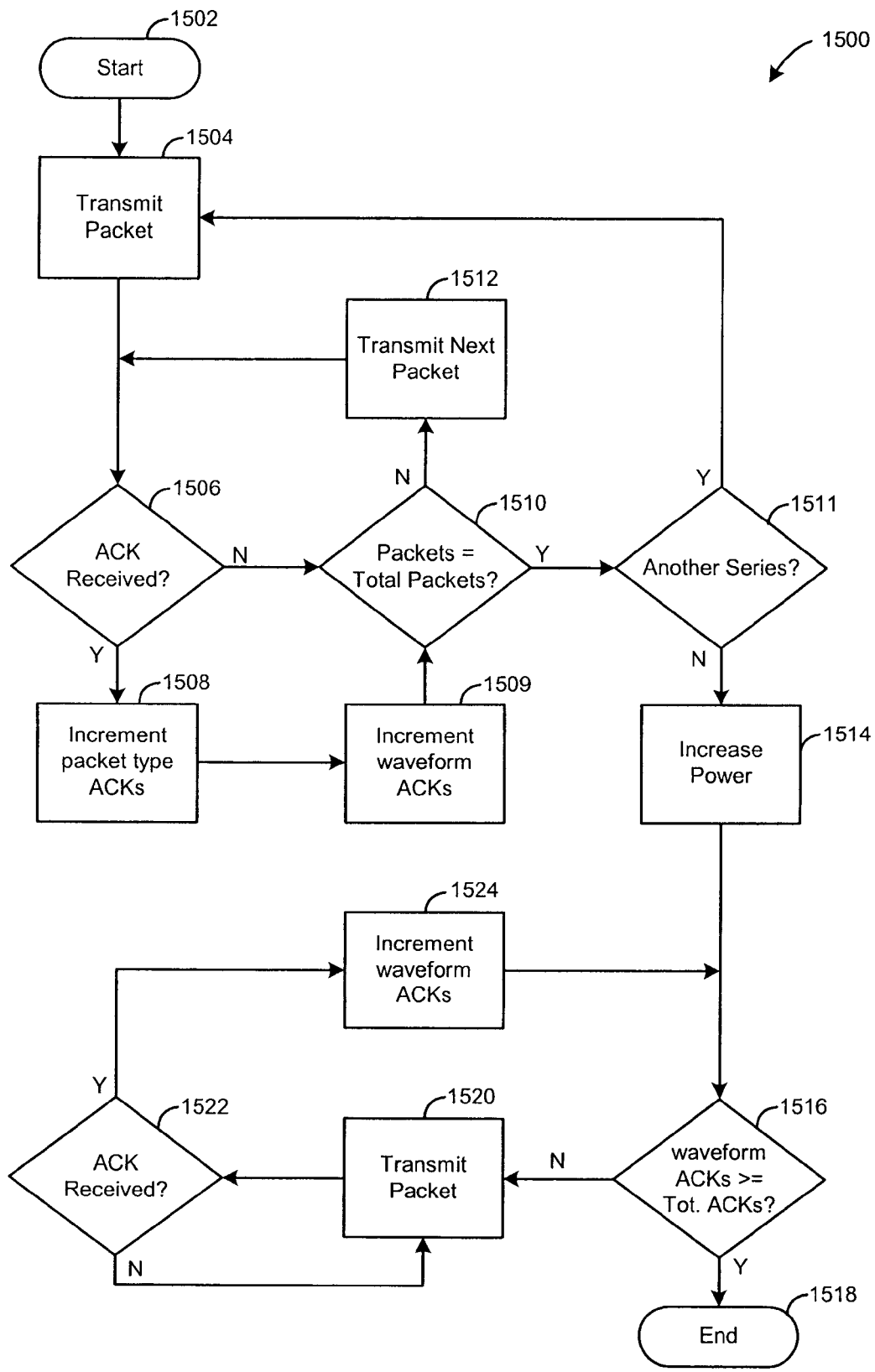
FIG. 15 is a flowchart depicting alternative exemplary steps that can be taken by the test equipment while performing a sensitivity test using varying transmit powers and modulation types.

Referring now to FIG. 15, alternative exemplary steps that can be taken by the test equipment 160 while performing a sensitivity test of the DUT 100 using the waveform 1300 are generally identified at 1500. The process starts in step 1502. In step 1504, the test equipment 160 transmits a first packet of the waveform 1300 (e.g., a first packet of packets 1302). In step 1506, the test equipment 160 determines whether an acknowledgment packet was received in response to transmitting the first packet of the waveform 1300.

If an acknowledgment packet was received, the test equipment 160 increments a packet type acknowledgment count (e.g., a packet type acknowledgment count for packets 1302) in step 1508. In step 1509, the test equipment 160 increments an acknowledgement packet count for the entire waveform 1300 and the process proceeds to step 1510. If an acknowledgment packet was not received, the process simply proceeds to step 1510. In step 1510, the test equipment 160 determines whether the number of packets transmitted is equal to the predetermined number of packets for the packet type (e.g., packets 1302). If the number of packets transmitted is not equal to the predetermined number of packets, the test equipment 160 transmits the next packet in the waveform 1300 (e.g., a second packet of packets 1302) in step 1512 and the process returns to step 1506.

If the number of packets transmitted is equal to the predetermined number of packets, the controller 702 determines whether another series of packets (e.g., packet 1304) is included in the waveform 1300 in step 1511. If another series of packets is included in the waveform 1300, the process returns to step 1504. However, if another series of packets is not include in the waveform 1300 (e.g., the process has cycled through packets 1302-1312), the controller 702 sets the power level of the transmitter 714 to a predetermined level that the DUT 100 is capable of receiving in step 1514.

In step 1516, the test equipment 160 determines whether the acknowledgment packet count is greater than or equal to the predetermined number of acknowledgment packets for the entire waveform 1300. If the acknowledgement packet count is greater than of equal to the predetermined number of acknowledgement packets, the process ends in step 1518. If the acknowledgment packet count is not greater than or equal to the predetermined number of acknowledgment packets, the test equipment 160 transmits a next packet of the waveform 1300 (e.g., a next packet of packets 1302) in step 1520. The test equipment 160 determines whether an acknowledgment packet was received in response to transmitting the packet in step 1522. If an acknowledgment packet was received, the test equipment 160 increments the acknowledgment packet count in step 1524. However, if an acknowledgment packet was not received, the process returns to step 1520.

As noted above, among other advantages, by pre-programming a wireless transceiver with a predetermined test flow, minimal, if any, communication between the wireless transceiver and host processor is needed during testing. Furthermore, by providing for PER and/or sensitivity test to be implemented using the predetermined test flow, or sequence, to verify the performance of the embedded wireless transceiver, manufactures can calibrate a wireless device with minimal changes required for production testing. Other advantages will be recognized by those of ordinary skill in the art.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A test equipment for testing a wireless communication device, comprising:
   a wireless transceiver that is operative to transmit a first series of packets while operating in a first mode, to transmit a second series of packets while operating in a second mode, and to receive acknowledgment packets; and
   a controller that is operative to control said transceiver to transmit said first series of packets, to count said acknowledgment packets received by said transceiver in response to transmitting each of said first series of packets, and to control said transceiver to transmit said second series of packets when said count exceeds a predetermined count.

2. The test equipment of claim 1 wherein said transceiver transmits at a first power level when in said first mode and a second power level when in said second mode.

3. The test equipment of claim 2 wherein said controller sets said first power level to a predetermined power level when said transceiver transmits a predetermined number of packets without receiving at least one of said acknowledgment packets in response to transmitting said first series of packets.

4. The test equipment of claim 1 wherein said transceiver transmits using a first modulation technique when in said first mode and a second modulation technique when in said second mode.

5. The test equipment of claim 1 wherein said transceiver transmits at a first data rate when in said first mode and a second data rate when in said second mode.

6. The test equipment of claim 1 further comprising memory operative to store information that includes at least one of said first mode, said second mode, a total number of packets transmitted, a total number of packet type acknowledgement packets, and a total number of waveform acknowledgment packets received.

7. The test equipment of claim 6 wherein said controller is operative to transfer said information to an analysis system after a predetermined number of packets have been transmitted and after receiving a last acknowledgement packet.

8. The test equipment of claim 7 wherein said analysis system is operative to determine at least one of a sensitivity value and a packet error rate based on said information.

9. A wireless communication system in a test environment comprising the test equipment of claim 1 and further comprising a device under test (DUT) that is operative to receive said first series of packets and transmits said acknowledgement packets when each of said first series of packets are received.

10. A method of testing a wireless communication device, comprising:
    transmitting a first series of packets, separated by a predetermined threshold, while operating in a first mode;
    receiving an acknowledgement packet in response to transmitting each of said first series of packets;
    counting said acknowledgement packets received; and
    transmitting a second series of packets, while operating in said second mode, when said count exceeds a predetermined count.

11. The method of claim 10 further comprising transmitting at a first power level when operating in said first mode and transmitting at a second power level when operating in said second mode.

12. The method of claim 11 further comprising setting said first power level to a predetermined power level when a predetermined number of packets have been transmitted without receiving at least one of said acknowledgement packets in response to transmitting said first series of packets.

13. The method of claim 10 further comprising transmitting using a first modulation technique when operating in said first mode and transmitting using a second modulation technique when operating is said second mode.

14. The method of claim 10 further comprising transmitting at a first data rate when operating in said first mode and transmitting at a second data rate when operating in said second mode.

15. The method of claim 10 further comprising storing information that includes at least one of said first mode, said second mode, a total number of packets transmitted, a total number of packet type acknowledgement packets, and a total number of waveform acknowledgment packets received.

16. The method of claim 15 further comprising transferring said information to an analysis system after a predetermined number of packets have been transmitted and after receiving a last acknowledgement packet.

17. The method of claim 15 further comprising determining at least one of a sensitivity value and a packet error rate based on said information.

* * * * *

UNITED STATES PATENT AND TRADEMARK OFFICE
CERTIFICATE OF CORRECTION

| | | |
|---|---|---|
| PATENT NO. | : 7,865,147 B2 | Page 1 of 1 |
| APPLICATION NO. | : 11/839828 | |
| DATED | : January 4, 2011 | |
| INVENTOR(S) | : Christian Volf Olgaard and Peter Petersen | |

It is certified that error appears in the above-identified patent and that said Letters Patent is hereby corrected as shown below:

Error In: Detailed Description, Column 12, line 4
Data: if the power level indicator 858 indicates that the signal
Correct Data: if the power level indicator 848 indicates that the signal Error In: Detailed Description, Column 16, line 28
Data: not include in the waveform 1300 (e.g., the process has cycled
Correct Data: not included in the waveform 1300 (e.g., the process has cycled Error In: Detailed Description, Column 16, line 37
Data: count is greater than of equal to the predetermined number of
Correct Data: count is greater than or equal to the predetermined number of Error In: Patent Claim 13, line 28-29
Data: technique when operating is said second mode.
Correct Data: technique when operating in said second mode.

Signed and Sealed this
Fifteenth Day of March, 2011

David J. Kappos
*Director of the United States Patent and Trademark Office*